UNITED STATES PATENT OFFICE.

MELVILLE G. PETERS AND JAMES AITKEN SHEPHERD, OF GLASGOW, SCOTLAND.

DRESSING FOR WATERPROOF COVERS OR TARPAULINS.

SPECIFICATION forming part of Letters Patent No. 719,502, dated February 3, 1903.

Application filed July 2, 1902. Serial No. 114,143. (Specimens.)

*To all whom it may concern:*

Be it known that we, MELVILLE GORDON PETERS and JAMES AITKEN SHEPHERD, subjects of the King of the United Kingdom of Great Britain and Ireland, residing at 92 West Regent street, Glasgow, Scotland, have invented a certain new and useful Dressing for Waterproof Covers or Tarpaulins, (for which application for patent has been made in Great Britain, No. 268, dated January 4, 1902,) of which the following is a specification.

This invention consists of an improved dressing or composition for saturating or coating fabrics used as waterproof coverings or tarpaulins and which is designed to impart greater flexibility to the covers and to facilitate their more rapid drying when coated.

The improved dressing is composed of boiled linseed-oil, gum-tragasol, lime-water, and coloring-matter, such as lampblack or ocher, litharge or other drier, and petroleum spirit, the gum being added to the other ingredients to impart the desired flexibility and ready-drying quality. While the proportions of the ingredients may be varied, we prefer to employ approximately the following, viz: fifteen pounds boiled linseed-oil, five pounds gum-tragasol, one and one-half pounds coloring-matter, one-half pound litharge or other drier, one and one-half pounds petroleum spirit, one-half gallon lime-water.

The gum-tragasol employed is a gum made from the kernals or beans of the locust or carob tree, the process for the production of which is set forth in the United States Letters Patent No. 566,497.

Having now described our invention, what we claim, and desire to secure by Letters Patent, is—

A composition for saturating or coating waterproof fabrics, consisting of an intimate mixture of boiled linseed-oil, gum-tragasol, coloring-matter and drier, petroleum spirit, and lime-water in about the proportions stated substantially as and for the purpose set forth.

In witness whereof we have hereunto set our hands in presence of two witnesses.

MELVILLE G. PETERS.
  JAMES AITKEN SHEPHERD.

Witnesses:
  WALLACE FAIRWEATHER,
  W. CRANSTON FAIRWEATHER.